United States Patent [19]

Scheuble et al.

[11] Patent Number: 4,886,344

[45] Date of Patent: Dec. 12, 1989

[54] ELECTRO-OPTICAL DISPLAY ELEMENT

[75] Inventors: Bernhard Scheuble, Alsbach; Günter Baur, Freiburg; Waltraud Fehrenbach, Erlenweg, all of Fed. Rep. of Germany

[73] Assignee: Merck Patent Gesellschaft Mit Beschrankter Haftung, Darmstadt, Fed. Rep. of Germany

[21] Appl. No.: 235,753

[22] Filed: Aug. 19, 1988

Related U.S. Application Data

[63] Continuation of Ser. No. 774,680, Sep. 11, 1985, abandoned.

[30] Foreign Application Priority Data

Sep. 11, 1984 [DE] Fed. Rep. of Germany ....... 3433248

[51] Int. Cl.$^4$ ................................................ G02F 1/13
[52] U.S. Cl. ............................ 350/350 R; 350/347 E; 350/347 R
[58] Field of Search ................ 350/337, 347 E, 347 R, 350/350 R

[56] References Cited

U.S. PATENT DOCUMENTS

| | | | |
|---|---|---|---|
| 4,115,310 | 9/1978 | Sato et al. ........................ | 350/350 R |
| 4,410,445 | 10/1983 | Baur et al. ...................... | 350/350 R |
| 4,472,592 | 9/1984 | Takatsu et al. .................. | 350/350 R |

OTHER PUBLICATIONS

J. A. Castellano, "Liquid Crystals for Electro-Optical Application", RCA Review, No. 296, vol. 33, Mar. 1972.
P. McIntyre, "Transmission of Light Through a Twisted Nematic Liquid Crystal Layer", J. Opt. Soc. Am., vol. 68, No. 6, Jun. 1978.
M. Goseianski, "Optical Characteristic of Twisted Nematic Liquid Crystal", J. Appl. Phys., vol. 48, No. 4, Apr. 1977.
F. Allan, "The Optimization of Twisted Nematic Display Thickness", Journal of the Society for Information Display, No. 14, Oct. 1983.
C. H. Gooch and H. A. Tarry, "Optical Characteristics of TN Liquid Crystal Films", Electronic Lett., No. 1, vol. 10, 1/10/1974.
Gooch and Tarry, "The Optical Properties of TN Liquid Crystal Structure with Twist Angles $<90°$", J. Phys. D:Appl. Phys., No. 1575, vol. 8, 1975.
G. Baur, "Mol. Cryst. Liq. Cryst.", vol. 63, pp. 45–58 (1981).
Birecki et al., in "The Physics and Chemistry of Liquid Crystal Devices" (edited by G. J. Sprokel), pp. 125–142, N.Y., 1981.
G. Baur, in "The Physics and Chemistry of Liquid Crystal Devices", (edited by G. J. Sprokel), pp. 61–77, N.Y., 1981.
D. W. Berreman, "Liquid–Crystal Cell Dynamics with Backflow", J. Appl. Phys., vol. 46, No. 9, 9/1975.
Schadt et al., Class Specific Physical Properties of Liquid Crystals, Z. Naturforsch 37A, 165–178 (1982).

Primary Examiner—Stanley D. Miller
Assistant Examiner—Huy Kim Mai
Attorney, Agent, or Firm—Millen, White & Zelano

[57] ABSTRACT

A suitable choice of the liquid crystal parameters $K_3/K_1$ and $\Delta E/E_1$ makes it possible in electrooptical display elements to obtain both a minimum dependence on the angle of observation and, simultaneously, a steep electro-optical characteristic when operated in the first transmission minimum.

18 Claims, 1 Drawing Sheet

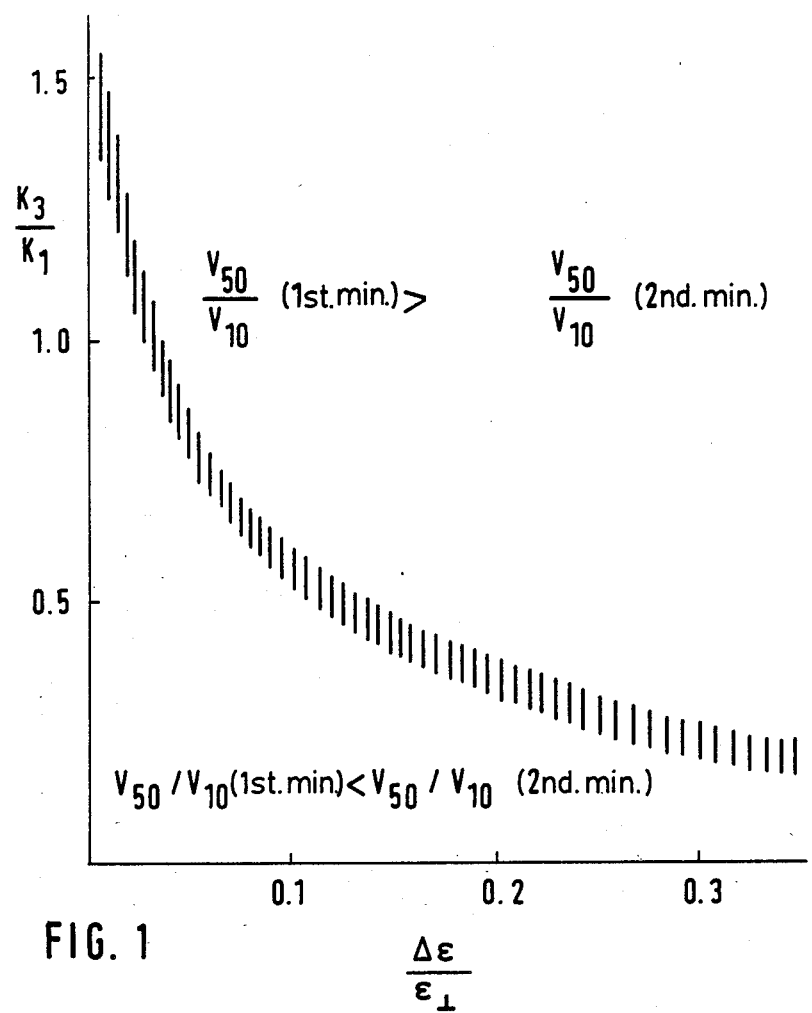

ELECTRO-OPTICAL DISPLAY ELEMENT

This application is a continuation of application Ser. No. 06/774,680, filed Sept. 11, 1985, now abandoned.

BACKGROUND OF THE INVENTION

The invention relates to an electro-optical display element with a very small dependence of the contrast on the angle of observation and with a particularly steep electro-optical characteristic curve.

The properties of nematic or nematic-cholesteric liquid-crystalline materials are utilized for liquid-crystal display elements in order to effect significant changes in their optical properties, such as light transmission, light scattering, birefringence, reflectance or color, under the influence of electric fields. The functioning of display elements of this type is based here, for example, on the phenomena of dynamic scattering, the deformation of aligned phases or the Schadt-Helfrich effect in the twisted cell.

Among these liquid-crystal display elements, twisted nematic cells (TN cells) have gained particular importance recently, because they can be operated with relatively low control voltages which can be readily made available even by small batteries. Moreover, these display elements have hitherto been the best which can be constructed as matrix display elements which allow the presentation of a high information density without an intolerably large numer of control lines, lead-ins and lead-outs.

When used in practice, however, the TN cell, in particular in the form of matrix display elements, still raises difficulties. These include above all the more or less pronounced dependence of the contrast on the angle of observation and the restricted multiplexing capacity.

Proposed solutions for both problems are already to be found in the literature, and some of these have been put into practice. Thus, for example, the dependence of the contrast on the angle of observation in a TN cell can be significantly improved by suitable choice of the refractive index anisotropy $\Delta n$ and of the cell thickness d [L. Pohl, G. Weber, R. Eidenschink, G. Baur and W. Fehrenbach, Appl. Phys. Lett. 38 (1981) 497].

Particularly in the so-called first transmission minimum according to Gooch and Tarry [C. H. Gooch and H. A. Tarry, J. Phys. D8 (1975) 1575], the dependence of the contrast on the angle of observation is at a minimum. This requires the condition $$d \cdot \Delta n = \frac{\lambda \cdot \sqrt{3}}{2}$$

to be met ($\lambda$=wavelength of the light used).

The multiplexing capacity of a TN cell is determined by the liquid crystal parameters $K_1, K_2, K_3$ (elastic constants for spreading, twisting and bending), by the dielectric constants $\epsilon_\perp$ and $\epsilon_\parallel$, and by the refractive indices $n_o$ and $n_e$, and also by cell parameters, such as, for example, the twist angle and tilt angle at the surface of the substrate. The influence of these material parameters and cell parameters has already been investigated by several authors [D. W. Berreman J. Appl. Phys. 46 (1975) 3746; F. Gharadjedaghi and J. Robert, Rev. Phys. Appl. 11 (1976) 467; G. Baur, in "The Physics and Chemistry of Liquid Crystal Devices" (edited by G. J. Sprokel) Plenum, N.Y., (1981) pages 61 et seq.; G. Baur, Mol. Crystl. Liq. Cryst. 63 (1981) 45; C. Z. van Doorn, C. J. Gerritsma and J. J. M. J. de Klerk, in "The Physics and Chemistry of Liquid Crystal Devices" (edited by G. J. Sprokel) Plenum, N.Y., (1980), pages 95 et seq.; F. J. Kahn and H. Birecki, in "The Physics and Chemistry of Liquid Crystal Devices" (edited by G. J. Sprokel) Plenum, N.Y., (1980a), (1980b), pages 125 et seq].

According to an approximation equation, the multiplexing capacity is estimated by $$p = 0.133 + 0.0266(K_3/K_1 - 1) + 0.443 \left( \ln \frac{d \cdot \Delta n}{2\lambda} \right)^2$$

[M. Schadt and P. R. Gerber, Zeitschrift Naturforsch. 37a (1982) 165].

The smaller p, the higher the multiplexing capacity. According to this estimation, only the $K_3/K_1$ ratio and $\Delta n.d$ affect the steepness of the electro-optical characteristic curve and hence the multiplexing capacity. The $K_2/K_1$ and $(\epsilon_\parallel - \epsilon_\perp)/\epsilon_\perp = \Delta\epsilon/\epsilon_\perp$ ratios are disregarded.

Experimental investigations of TN cells with the liquid crystal materials hitherto predominantly used have shown that the steepness of the electro-optical characteristic in the second transmission minimum is better than that in the first minimum, whereas the dependence on the angle of observation in the first minimum is better than that in the second transmission minimum.

By means of the proposed solutions hitherto known, the most important difficulties arising in the construction and use of TN cells can admittedly be solved individually, but not simultaneously.

The disclosures of all of the references cited above are incorporated by reference herein.

SUMMARY OF THE INVENTION

It is an object of the invention to provide electro-optical display elements, in which both a minimum dependence on the angle of observation and, simultaneously, also the steepest possible electro-optical characteristic are ensured by operating the display elements in the first transmission minimum according to Gooch and Tarry.

Upon further study of the specification and appended claims, further objects and advantages of this invention will become apparent to those skilled in the art.

It has now been found that, with a suitable choice of the liquid crystal parameters, it is possible, surprisingly, to obtain both minimum dependence on the angle of observation and, simultaneously, a steep electro-optical characteristic curve by operating the display elements in the first transmission minimum.

A subject of the invention, therefore, is an electro-optical display element with a liquid-crystalline phase comprising at least two components, and wherein the electro-optical characteristic in the first transmission minimum is at least as steep as that in the second transmission minimum.

The invention also relates to a method of simultaneously minimizing the dependence of contrast on the angle of observation of an electro-optical display element based on a liquid crystal phase and of maximizing its multiplexing capacity by maximizing its steepness of its characteristic curve, comprising operating the element in the first Gooch and Tarry transmission minimum, and selecting a phase having a $K_3/K_1$ ratio and a $\Delta\epsilon/\epsilon_\perp$ ratio consistent with the attainment of a characteristic curve in the first transmission minimum which is steeper than that in the second such transmission minimum.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 1 contains a diagram of $K_3/K_1$ values vs. $\Delta\epsilon/\epsilon_\perp$ values which is useful in implementing this invention

DETAILED DISCUSSION

The construction of the liquid crystal display element according to the invention from polarizers, electrode base plates and electrodes with such a surface treatment that the preferential orientation of the particular adjoining liquid crystal molecules is usually twisted by 90° from one electrode to the other, corresponds to the type of construction conventional for such display elements. The concept of the conventional type of construction is here taken in a very wide sense and also comprises all the variations and modifications, known from the literature, of the twisted nematic cell, and in particular also matrix display elements and the display elements according to German Offenlegungsschrift 2,748,738 which additionally contain magnets. An essential difference between the display elements according to the invention and those hitherto conventional and based on the twisted nematic cell is, however, the choice of the liquid crystal parameters in the liquid crystal layer. Whereas, for example, the $K_3/K_1$ ratio in the conventional liquid-crystalline phases for display elements of this type is $>0.8$ and the $\Delta\epsilon/\epsilon_\perp$ ratio is normally between 1.2 and 1.7, the $K_3/K_1$ ratio in the display elements according to the invention is $\leq 0.8$.

In the display elements according to the invention, liquid-crystalline phases are used in which the liquid crystal parameters $K_3/K_1$ and $\Delta\epsilon/\epsilon_\perp$ are chosen such that both a minimum dependence on the angle of observation and, simultaneously, also the steepest possible electro-optical characteristic are ensured by operating the display elements in the first transmission minimum.

FIG. 1 is a diagrammatic drawing which illustrates those pairs of values of the parameters $K_3/K_1$ and $\Delta\epsilon/\epsilon_\perp$ which can be chosen (below the dashed area) in order to ensure that the electro-optical characteristic in the first transmission minimum is steeper than that in the second. Above the dashed area the electro-optical characteristic in the second transmission minimum is steeper than that in the first minimum ($V_{50}/V_{10}$ (1st minimum) > $V_{50}/V_{10}$ (2nd minimum)). Preferably those pairs of values of the parameters $K_3/K_1$ and $\Delta\epsilon/\epsilon_\perp$ are chosen which are below the dashed area in FIG. 1. The dashed area in FIG. 1 represent the boundary where the steepness of the electro-optical characteristic curve in the first minimum is equal to that in the second minimum. When $K_3/K_1$ and/or $\Delta\epsilon/\epsilon_\perp$ are smaller, the steepness in the first minimum is better than that in the second minimum. Electro-optical display elements having a steeper electro-optical characteristic curve in the first transmission minimum than that in the second minimum are preferred.

Particularly preferred parameter combinations are $K_3/K_1 \leq 0.4$ and $\Delta\epsilon/\epsilon_\perp \leq 0.3$, and also $K_3/K_1 \leq 0.8$ and $\Delta\epsilon/\epsilon_\perp \leq 0.05$. Preferably, the smallest possible $K_3/K_1$ ratio is chosen, for example 0.8 to 0.2, in particular 0.7 to 0.3. The smaller the chosen value of $K_3/K_1$, the greater can $\Delta\epsilon/\epsilon_\perp$ be for display elements according to the invention and the more favorable is the threshold voltage. In order to obtain a favorable threshold voltage, $\Delta\epsilon/\Delta\epsilon_\perp$ is thus chosen to be preferably $\geq 0.05$, in particular $\geq 0.1$.

The parameters used to define the invention are fully known to skilled workers. The contemplated definitions are to be found in many publications, e.g. W. H. De Jeu, Physical Properties of Liquid Crystal Materials, Gordon and Breach, 1980 and the brochure "Liquid Crystals, Measurement of the Physical Properties" of E. Merck, whose disclosures are incorporated by reference herein.

The thickness of a liquid crystal layer of the display element according to the invention and/or the optical anisotropy $\Delta n$ of the liquid crystal material are chosen such that $$d \cdot \Delta n = \frac{\lambda}{2} \cdot \sqrt{3}$$

the value of 550 nm, normally used for the maximum sensitivity of the human eye, being taken for the wavelength $\lambda$. The layer thicknesses of the display elements according to the invention can, for example, be within the range from 2 to 10 $\mu$m. Preferably, the smallest possible layer thicknesses are chosen, the lower limit of d being determined by the quality standards required for mass production. A particularly preferred range of d is thus 3 to 8 $\mu$m, in particular 4 to 7 $\mu$m.

Liquid-crystalline dielectrics, the material parameters of which are within the ranges according to the invention, can be prepared from conventional liquid-crystalline base materials. Numerous such materials are known from the literature. Advantageously, the dielectrics used for the display elements according to the invention contain at least 0.5, preferably at least 30, in particular at least 95% by weight of a mixture of at least 2, preferably 3 to 15, in particular 4 to 10 liquid-crystalline compounds which each contain at least one structural element from the series I to VIII, it being possible for the structural elements I to IV to be unsubstituted or also to be substituted, for example, by F, Cl, $CH_3$ and/or CN or to be present in the form of the corresponding N-oxides:

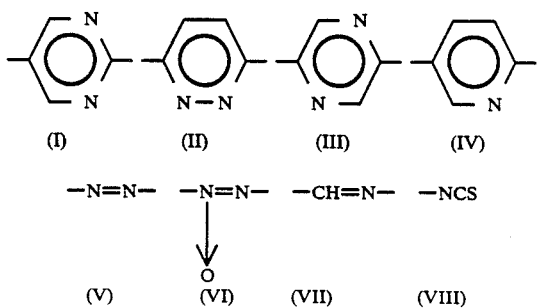

Preferably, these liquid crystal compounds additionally contain a 1,4-phenylene group.

Such dielectrics can additionally contain dyes and/or doping substances in the usual quantities, unless the liquid crystal parameters are thus taken out of the ranges according to the invention.

Mixing of the liquid crystalline components to achieve the parameters discussed above can be routinely accomplished by the usual preliminary orientation experiments taking into account the usual considerations. Some of the many publications, whose disclosures are incorporated by reference herein, disclosing details of suitable materials include German Offenlegungsschrift 2,257,588; 2,306,738; 2,017,727; 2,321,632; European Published Application 0,126,883; U.S. Pat. Nos. 3,997,536; 4,062,798; 4,462,923; 4,389,329; 4,364,838; 4,066,570; 4,452,718; 4,419,262; 4,510,069; Japanese Published Applications 144,770/84; 144,771/84; 144,772/84 43,961/83; D. Demus et al., Flüssige Kristalle in Tabellen, VEB Deutscher Verlag für Grundstoffindustrie, Leipzig 1974 and D. Demus et al., Flüssige Kristalle in Tabellen II, VEB Deutscher Verlag für Grundstoffindustrie, Leipzig 1984.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

A TN cell with a liquid-crystalline phase consisting of

15% of 2-p-methoxyphenyl-5-hexylpyrimidine
15% of 2-p-pentoxyphenyl-5-hexylpyrimidine
15% of 2-p-heptoxyphenyl-5-hexylpyrimidine
13% of 2-p-nonoxyphenyl-5-hexylpyrimidine
15% of 2-p-methoxyphenyl-5-heptylpyrimidine
15% of 2-p-heptoxyphenyl-5-heptylpyrimidine
12% of 2-p-nonoxyphenyl-5-heptylpyrimidine (clear point 53°) shows a dielectric anisotropy $\Delta\epsilon$ of $+0.9$, and $\epsilon_{\parallel}$ of 4.0, and $\epsilon_{\perp}$ of 3.1, a $\Delta\epsilon/\epsilon_{\perp}$ of 0.29, an optical anisotropy $\Delta n$ of 0.168 and a $K_3/K_1$ of 0.40. The angle of incidence $\alpha_o$ on the glass surface is 0.50. When operated in the first minimum (that is to say $d.\Delta n = 0.48$), such a TN cell shows a steepness of the electro-optical characteristic curve of 1.11 ($V_{50}/V_{10}$), whereas the steepness is poorer in the case of operation in the second minimum ($V_{50}/V_{10} = 1.12$).

EXAMPLE 2

A TN cell with a liquid-crystalline phase consisting of

14% of 2-p-methoxyphenyl-5-hexylpyrimidine
14% of 2-p-pentoxyphenyl-5-hexylpyrimidine
14% of 2-p-heptoxyphenyl-5-hexylpyrimidine
13% of 2-p-nonoxyphenyl-5-hexylpyrimidine
14% of 2-p-methoxyphenyl-5-heptylpyrimidine
14% of 2-p-heptoxyphenyl-5-heptylpyrimidine
12% of 2-p-nonoxyphenyl-5-heptylpyrimidine and
5% of r-1-cyano-cis-4-(trans-4-butylcyclohexyl)-1-heptylcyclohexane (clear point 55°) shows a dielectric anisotropy $\Delta\epsilon$ of $+0.5$, a $\Delta\epsilon/\epsilon_{\perp}$ of 0.14 and a $K_3/K_1$ of 0.42. When operated in the first minimum, this cell has a steepness $V_{50}/V_{10}$ of 1.08, whereas $V_{50}/V_{10}$ is 1.095 in the second minimum. The steepness of the characteristic curve is therefore substantially better in the first minimum.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In an electro-optical display element based on a liquid-crystalline phase comprising at least two compounds, the improvement wherein the electro-optical characteristic curve of the phase in the first Gooch and Tarry transmission minimum is at least as steep as that in the second such transmission minimum.

2. An electro-optical display element of claim 1, based on a twisted nematic cell.

3. An electro-optical display element of claim 2, wherein the ratio of the parameter $K_3$ of said phase to the parameter $K_1$ of said phase is $\leq 0.8$.

4. An electro-optical display element of claim 3, wherein the ratio of the parameter $\Delta\epsilon$ of said phase to the parameter $\Delta_{\perp}$ of said phase is $\leq 0.3$.

5. An electro-optical display element of claim 2, wherein the ratio of the parameter $\Delta\epsilon$ of said phase to the parameter $\epsilon_{\perp}$ of said phase is $\leq 0.3$.

6. An electro-optical display element of claim 5, wherein the ratio of the parameter $K_3$ of said phase to the parameter $K_1$ of said phase is $\leq 0.8$.

7. An electro-optical display element of claim 5, wherein $\Delta\epsilon/\epsilon^{\perp}$ is $\geq 0.1$.

8. An electro-optical display element of claim 5, wherein the ratio of the parameter $K_3$ of said phase to the parameter $K_1$ of said phase is $\leq 0.7$–0.3.

9. An electro-optical display element of claim 2, wherein the ratio of the parameter $K_3$ of said phase to the parameter $K_1$ of said phase is 0.8–0.2.

10. An electro-optical display element of claim 2, wherein the ratio of the parameter $K_3$ of said phase to the parameter $K_1$ of said phase is 0.7–0.3.

11. An electro-optical display element of claim 10, wherein the ratio of the parameter $\Delta\epsilon$ of said phase to the parameter $\epsilon_{\perp}$ of said phase is $\leq 0.1$.

12. An electro-optical display element of claim 2, wherein the ratio of the parameter $K_3$ of said phase to the parameter $K_1$ of said phase is minimized and the ratio of the parameter $\Delta\epsilon$ of said phase to the parameter $\epsilon_{\perp}$ of said phase is maximized while the characteristic curve in the first transmission minimum is at least as steep as that in the second transmission minimum.

13. An electro-optical display element of claim 12, wherein the steepness of the characteristic curve in the first minimum is greater than that in the second minimum.

14. An electro-optical display element of claim 2, wherein the steepness of the characteristic curve in the first minimum is greater than that in the second minimum.

15. In a liquid crystal phase comprising at least two compounds, the improvement wherein the electro-optical characteristic curve of the phase in the first Gooch and Tarry transmission minimum is at least as steep as that in the second such transmission minimum.

16. A phase of claim 15, wherein the ratio of the parameter $K_3$ of said phase to the parameter $K_1$ of said phase is $\leq 0.4$ and the ratio of the parameter $\Delta\epsilon$ of said phase to the parameter $\epsilon_\perp$ of said phase is $\leq 0.3$.

17. A phase of claim 15, wherein the ratio of the parameter $K_3$ of said phase to the parameter $K_1$ of said phase is $\leq 0.8$ and the ratio of the parameter $\Delta\epsilon$ of said phase to the parameter $\epsilon_\perp$ of said phase is $\leq 0.5$.

18. A method of simultaneously minimizing the dependence of contrast on the angle of observation of an electro-optical display element based on a liquid crystal phase and of maximizing the multiplexing capacity of said element by maximizing the steepness of the characteristic curve of said element, comprising operating the element in the first Gooch and Tarry transmission minimum, and selecting a phase having a $K_3/K_1$ ratio and a $\Delta\epsilon/\epsilon_\perp$ ratio consistent with the attainment of a characteristic curve in the first transmission minimum which is steeper than that in the second such transmission minimum.

* * * * *

UNITED STATES PATENT AND TRADEMARK OFFICE
CERTIFICATE OF CORRECTION

PATENT NO. : 4,886,344

DATED : December 12, 1989

INVENTOR(S) : BERNHARD SCHEUBLE ET AL

It is certified that error appears in the above-identified patent and that said Letters Patent is hereby corrected as shown below:

Title page, inventors, third inventors city of residence:

reads " Erlenweg"

should read --Emmendingen--

Column 6, claim 4, line 25:

reads "the parameter $\Delta\perp$ of said phase is $\leq 0.3$.

should read -- the parameter $\epsilon_\perp$ of said phase is $\leq 0.3$. --

Signed and Sealed this

Nineteenth Day of March, 1991

*Attest:*

HARRY F. MANBECK, JR.

*Attesting Officer*      *Commissioner of Patents and Trademarks*